April 10, 1956  D. A. CASEY  2,741,174
COFFEE MAKER
Filed April 8, 1955  2 Sheets-Sheet 1
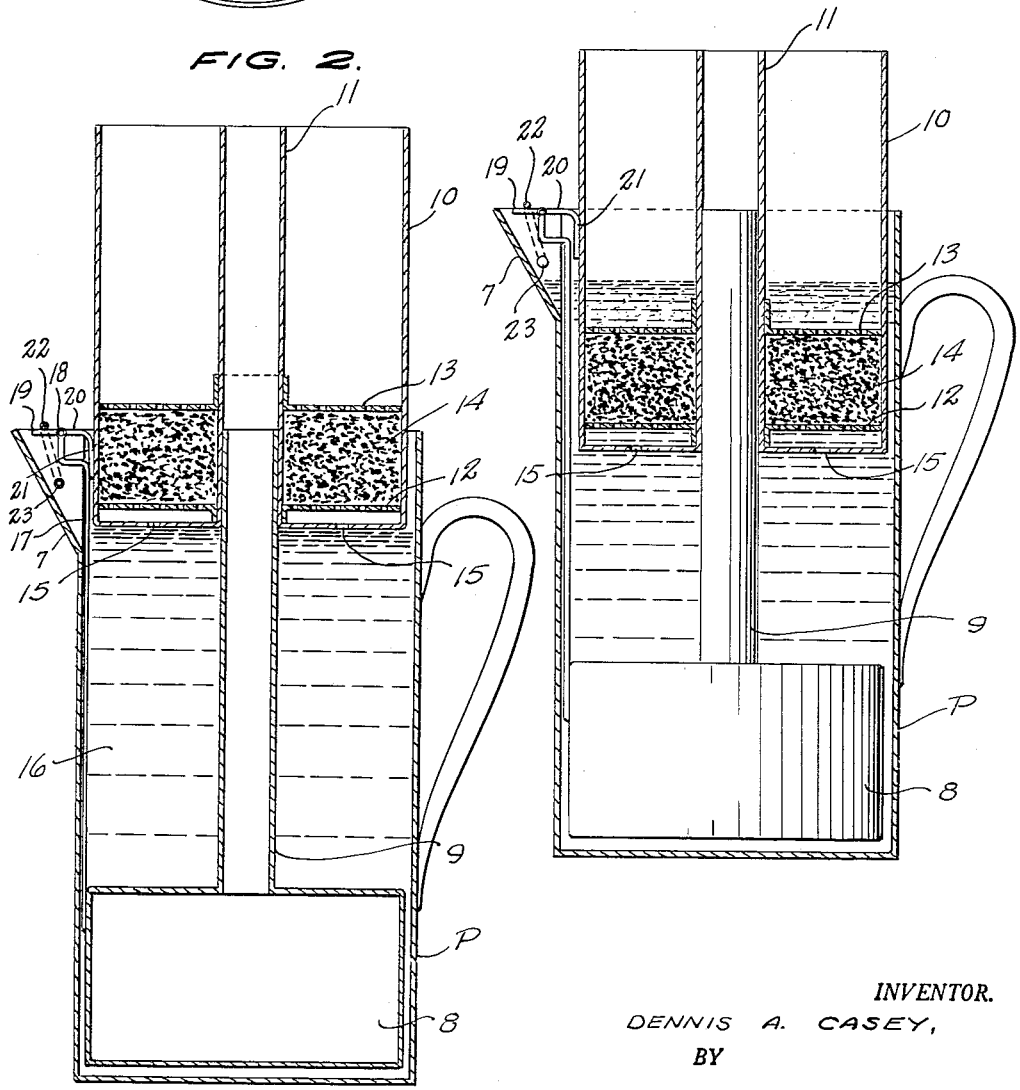
INVENTOR.
DENNIS A. CASEY,
BY
McMorrow, Berman & Davidson
ATTORNEYS.

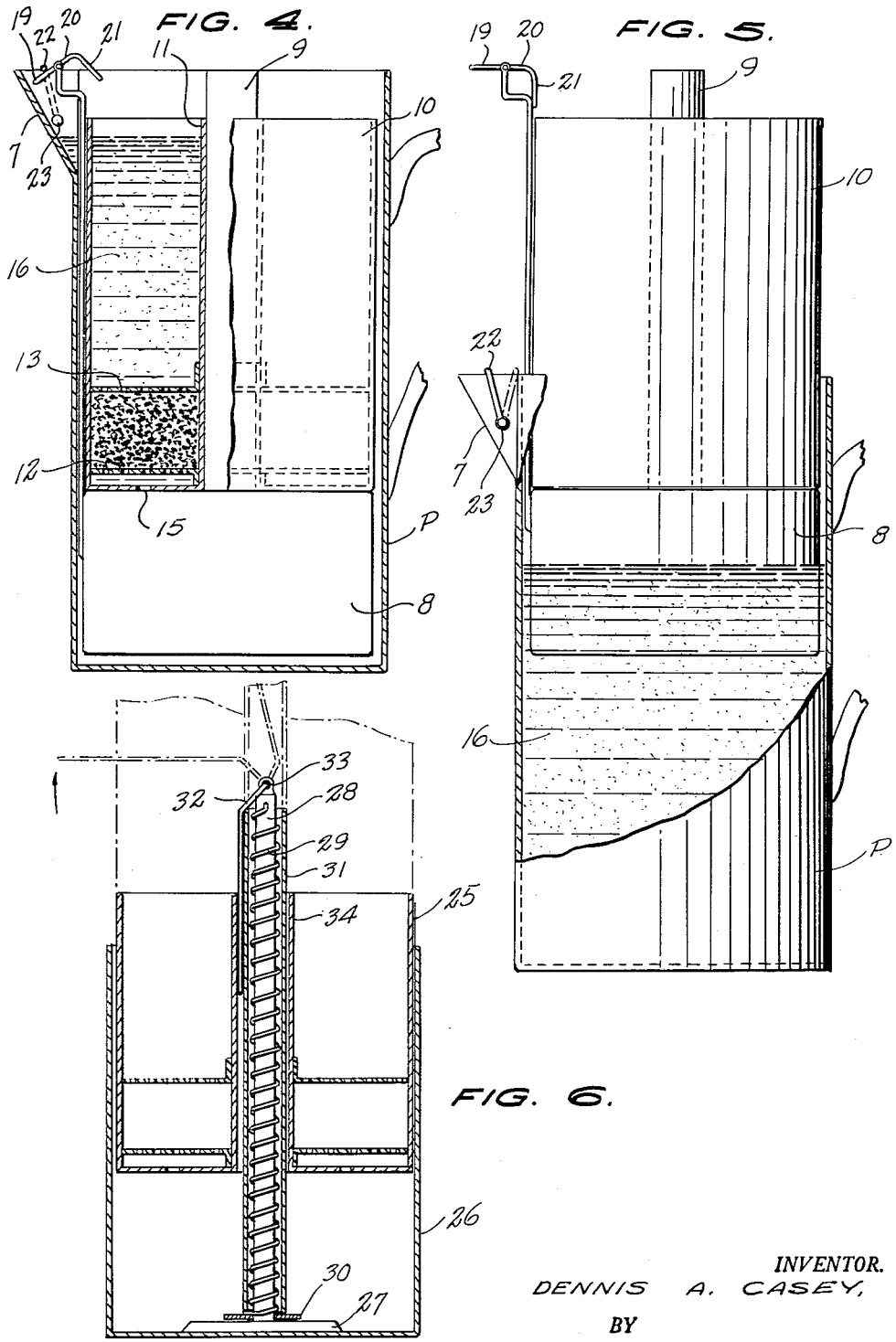

United States Patent Office 2,741,174
Patented Apr. 10, 1956

2,741,174

COFFEE MAKER

Dennis A. Casey, New Orleans, La.

Application April 8, 1955, Serial No. 500,141

3 Claims. (Cl. 99—283)

This invention relates, in general, to coffee makers.

One object of the invention, is to provide a simple means for making coffee, and to obtain a full extraction of the active ingredients from the ground coffee.

A further object, is to provide means, whereby a container, having ground coffee in it, is lowered into that water which passes up through the bottom of the container and through the coffee, and after the container has sunk to the bottom, means are provided to raise the container up through the water extract which passes through the bottom of the container, and through the coffee, again, to thus afford a very complete extraction of the soluble parts of the coffee.

Further objects, purposes, and characteristic features of the invention, will appear, as the description progresses, reference being made to the accompanying drawings, showing, solely by way of example, and in no way, in a limiting sense, two forms which the invention can assume.

In the drawings:

Figure 1 is a top plan view of a first form of device, in accordance with this invention;

Figure 2 is a sectional elevation of the first form with parts in one operative position;

Figure 3 is a sectional elevation of the first form, with parts in a different operative position;

Figure 4 is a sectional elevation of the first form, with parts in a still different operative position;

Figure 5 is a sectional elevation of the first form, with parts in yet a still different operative position; and, Figure 6 is a sectional elevation of a second form of the invention.

Referring now to Figures 1–5 of the drawing, this form of invention includes an outer container or pot P with a pouring spout 7. Slidably received in pot P is a float 8, with a central tube 9, which is open at the top, to care for pressure changes due to changes in temperature.

A coffee container 10 is slidable in pot P, and has a central, open tube 11, slidable on float tube 9. In container 10 is a lower circular strainer 12, fixed to tube 11, and a circular strainer 13, slidable on tube 11, whereby to suitably confine the ground coffee 14.

In the bottom of 10 are two small holes 15 to permit water 16 to pass through the coffee 14.

Connected to the float 8 is an upwardly extending arm 17, to which is pivoted at 18 at trigger having two horizontal portions 19 and 20 at opposite sides of pivot 18, and a depending portion 21.

Associated with the trigger is a latch 22 pivoted at 23 to spout 7, and movable to overlie either 19 or 20.

The operation of this device is as follows. Float 8 is placed in container P and latch 22 is moved to overlie portion 20, thus to hold the float down.

Hot water 16 is poured into P as in Figure 2.

Container 10, with coffee in it, is placed in the pot, and enters the water, as in Figure 2. Latch 22 can now be moved to release position, as in Figure 2, since portion 21 rests against the side of 10, to thus hold the float at the bottom of the pot.

Container 10 descends as water enters holes 15, and passes through the coffee, as in Figure 3.

Figure 4 shows coffee container 10, after it has completed its descent, at which time portion 21 of the trigger has cleared the side of 10 thus releasing float 8, which starts to rise as liquid starts to drain out of container 10.

Figure 5 shows the operation complete. The water has first passed up through the coffee, and then down through the coffee, and so has completely extracted the ingredients of the coffee, and is back in the pot and ready to service.

In Figure 6 is shown a second form of the invention, wherein the coffee container 25, slidable in pot 26, is spring returned, rather than float returned.

In this form, a base 27, in the bottom of 26, carries a rod 28, to the upper end of which is anchored one end of a tight coil spring 29. The other end of the spring carries a washer 30, and the spring and washer slide on the rod 28. A tube 31 is slidable over the rod and spring, and can be pushed down to move the washer 30 against the base 27 and thus to tension the spring.

A trigger 32 is pivoted at 33 to the upper end of rod 28, and, when turned to its full line position, Figure 6, can be held there, by the tube 34 of the coffee container 25, as it descends, as in the first form of invention. In this position the trigger holds tube 31 against being raised by the spring and washer.

When container 25 completes its descent, the trigger is cleared, and the container 25 is raised by the washer and spring, while tube 32 is raised and moves the trigger, successively, through the two dotted line positions, shown in Figure 6.

The above rather specific description, of two forms which the invention can assume, has been given solely by way of example, and in no way, in a limiting sense.

Furthermore, all such modifications, alterations, and variations, as fall within the scope of the appended claims, are intended to be protected by this disclosure.

What is claimed is:

1. A coffee maker, comprising, in combination, an outer container to be filled with hot water, a perforated bottom coffee container snugly slidable, by gravity, down into the outer container, raising means in the outer container operable, at times to raise the coffee container upwardly in the outer container, trigger means associated with the raising means and the coffee container and movable from an unlocked position to which it is biased by the raising means and in which position the raising means is effective, to a locked position in which it prevents operation of the raising means, the trigger means being positioned to be held in locked position by the coffee container while it is in, and sliding down into, the outer container, only until it has reached a predetermined point in its descent, said raising means including, a rod fixed to the bottom of the outer container, a coil spring sleeved on the rod, said trigger means being pivoted to the rod, and an open tube through the coffee container and slidable over the trigger means, spring, and rod.

2. A coffee maker, comprising, in combination, an outer container to be filled with hot water, a perforated bottom coffee container snugly slidable, by gravity, down into the outer container, raising means in the outer container operable, at times to raise the coffee container upwardly in the outer container, trigger means associated with the raising means and the coffee container and movable from an unlocked position to which it is biased by the raising means and in which position the raising means is effective, to a locked position in which it prevents operation of the raising means, the trigger means being positioned to be held in locked position by the coffee container while it is in, and sliding down into, the outer container, only until it has reached a predetermined point in its descent, said raising means including a float member snugly slidable in the outer container, a rod on the float member, a pivot connecting the trigger means to the rod, the trigger means contacting the side of the coffee container to hold the trigger means in locked position.

3. A coffee maker, comprising, in combination, an outer container to be filled with hot water, a perforated bottom coffee container snugly slidable, by gravity, down into the outer container, raising means in the outer container operable, at times to raise the coffee container upwardly in the outer container, trigger means associated with the raising means and the coffee container and movable from an unlocked position to which it is biased by the raising means and in which position the raising means is effective, to a locked position in which it prevents operation of the raising means, the trigger means being positioned to be held in locked position by the coffee container while it is in, and sliding down into, the outer container, only until it has reached a predetermined point in its descent, said raising means including a float member snugly slidable in the outer container, a rod on the float member, a pivot connecting the trigger means to the rod, the trigger means contacting the side of the coffee container to hold the trigger means in locked position, and a manually operable latch movable to a position to hold the trigger means in locked position.

References Cited in the file of this patent

UNITED STATES PATENTS

| | | |
|---|---|---|
| 1,884,070 | Mennicke | Oct. 25, 1932 |
| 1,887,848 | Pierce | Nov. 15, 1932 |
| 2,065,149 | Newman | Dec. 22, 1936 |
| 2,103,704 | Wygodsky | Dec. 28, 1937 |
| 2,209,831 | Schurig | July 30, 1940 |
| 2,450,177 | Allen | Sept. 28, 1948 |